United States Patent
Nishikawa

(10) Patent No.: US 9,311,074 B2
(45) Date of Patent: Apr. 12, 2016

(54) DISTRIBUTION CONTROL APPARATUS, DISTRIBUTION CONTROL METHOD, AND NON-TRANSITORY COMPUTER-READABLE MEDIUM

(71) Applicant: CANON KABUSHIKI KAISHA, Tokyo (JP)

(72) Inventor: Satoshi Nishikawa, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/258,161

(22) Filed: Apr. 22, 2014

(65) Prior Publication Data

US 2014/0351805 A1    Nov. 27, 2014

(30) Foreign Application Priority Data

May 27, 2013 (JP) ................................. 2013-111331

(51) Int. Cl.
  *G06F 9/445* (2006.01)
  *G06F 9/44* (2006.01)
  *G06F 3/12* (2006.01)

(52) U.S. Cl.
  CPC .. *G06F 8/65* (2013.01); *G06F 8/70* (2013.01); *G06F 3/123* (2013.01); *G06F 9/445* (2013.01)

(58) Field of Classification Search
  None
  See application file for complete search history.

(56) References Cited

U.S. PATENT DOCUMENTS

| | | | | |
|---|---|---|---|---|
| 7,600,055 | B2 * | 10/2009 | Douglas | G06F 8/65 710/17 |
| 2008/0082745 | A1 * | 4/2008 | Takada | G06F 3/061 711/113 |
| 2010/0079793 | A1 * | 4/2010 | Nishikawa | G06F 8/65 358/1.15 |
| 2010/0281080 | A1 * | 11/2010 | Rajaram | G06F 3/0608 707/813 |
| 2012/0257248 | A1 * | 10/2012 | Sato | 358/1.15 |

FOREIGN PATENT DOCUMENTS

JP    2002-259842 A    9/2002

* cited by examiner

*Primary Examiner* — Isaac T Tecklu
(74) *Attorney, Agent, or Firm* — Rossi, Kimms & McDowell LLP

(57) ABSTRACT

A distribution control apparatus that controls distribution of firmware to be mounted on an image forming apparatus in a network, comprises: a storage control unit configured to cause a first storage unit installed in the network to store different versions of firmware; a control unit configured to control, based on information of the different versions of firmware, publication and suspension of publication of the different versions of firmware; and a distribution unit configured to cause distribution of a publicized version of firmware from the first storage unit in accordance with a request, wherein the control unit causes deletion of a version of firmware whose publication is to be suspended from the first storage unit.

14 Claims, 18 Drawing Sheets

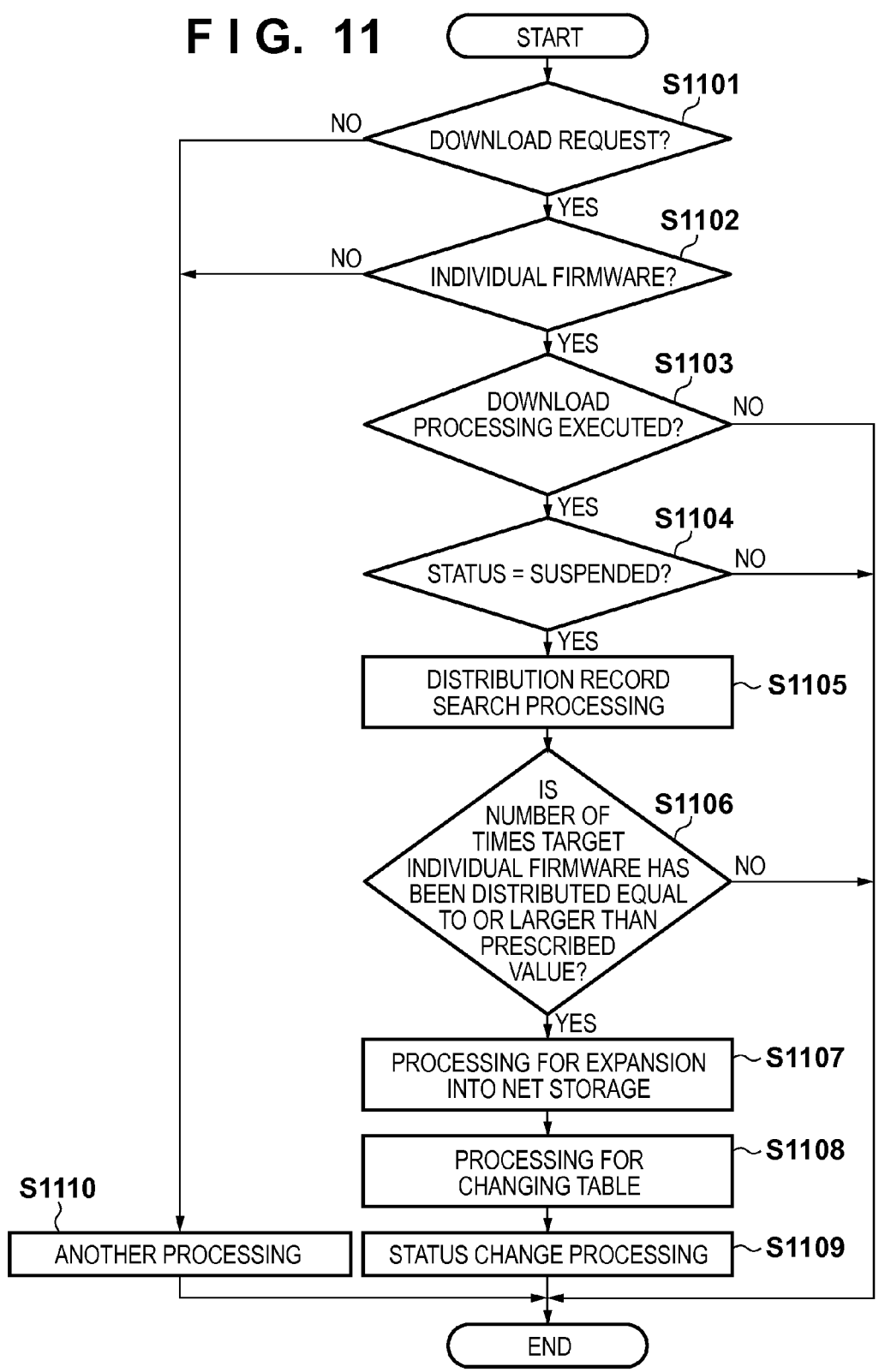

FIG. 12

| CONFIGURED SETTINGS | TIME PERIOD OF PUBLICATION IN MARKET | TIME PERIOD SINCE DATE OF LAST ACCESS | FIRMWARE TYPE | EXCLUSION FROM DETERMINATION REGARDING MOST RECENT VERSION |
|---|---|---|---|---|
| | SIX MONTHS | SIX MONTHS | NORMAL, INDIVIDUAL | INDIVIDUAL |

~1201

| | DATE OF PUBLICATION IN MARKET | DATE OF LAST ACCESS | FIRMWARE TYPE | AUTOMATIC SUSPENSION OF PUBLICATION |
|---|---|---|---|---|
| V1.0 | 2012.1.1 | 2012.2.1 | NORMAL | ALLOWED |
| V1.1 | 2012.2.1 | 2012.3.1 | NORMAL | ALLOWED |

~1202
~1203

F I G. 16
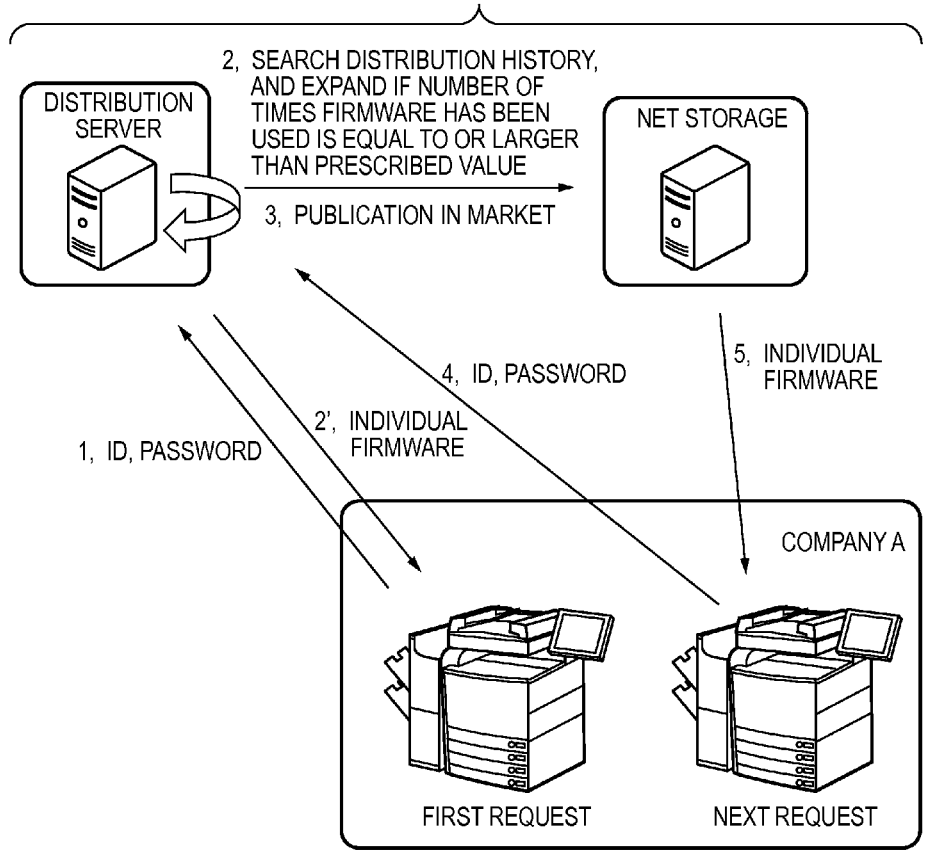
F I G. 17
| Status | Mode | Download |
|---|---|---|
| PUBLICIZED IN MARKET | MONITORING CENTER HOST | Active |
| PUBLICIZED IN MARKET | IMAGE FORMING APPARATUS | Active |
| PUBLICATION IN MARKET SUSPENDED | MONITORING CENTER HOST | Inactive |
| PUBLICATION IN MARKET SUSPENDED | IMAGE FORMING APPARATUS | Active |

FIG. 19A

PUBLICIZED IN MARKET, MONITORING CENTER HOST/IMAGE FORMING APPARATUS

| CONSTITUENT MODULE | URL FOR OBTAINMENT |
|---|---|
| ModuleA | High-Speed Net Storage URL/ModuleA-xxxx.nlf |
| ModuleB | High-Speed Net Storage URL/ModuleB-xxxx.nlf |
| ModuleC | High-Speed Net Storage URL/ModuleC-xxxx.nlf |
| ModuleD | High-Speed Net Storage URL/ModuleD-xxxx.nlf |
| ⋮ | ⋮ |

FIG. 19B

PUBLICATION IN MARKET SUSPENDED, MONITORING CENTER HOST

| CONSTITUENT MODULE | URL FOR OBTAINMENT |
|---|---|
| ModuleA | NONE |
| ModuleB | NONE |
| ModuleC | NONE |
| ModuleD | NONE |
| ⋮ | ⋮ |

FIG. 19C

PUBLICATION IN MARKET SUSPENDED, IMAGE FORMING APPARATUS

| CONSTITUENT MODULE | URL FOR OBTAINMENT |
|---|---|
| ModuleA | Internal HD URL/ModuleA-xxxx.nlf |
| ModuleB | Internal HD URL/ModuleB-xxxx.nlf |
| ModuleC | Internal HD URL/ModuleC-xxxx.nlf |
| ModuleD | Internal HD URL/ModuleD-xxxx.nlf |
| ⋮ | ⋮ |

FIG. 20A
PUBLICIZED IN MARKET, MONITORING CENTER HOST/IMAGE FORMING APPARATUS

| CONSTITUENT MODULE | |
|---|---|
| ModuleA | High-Speed Net Storage URL/ModuleA-xxxx.nlf |
| ModuleB | High-Speed Net Storage URL/ModuleB-xxxx.nlf |
| ModuleC | High-Speed Net Storage URL/ModuleC-xxxx.nlf |
| ModuleD | High-Speed Net Storage URL/ModuleD-xxxx.nlf |
| ⋮ | ⋮ |

FIG. 20B
PUBLICATION IN MARKET SUSPENDED, MONITORING CENTER HOST

| CONSTITUENT MODULE | |
|---|---|
| ModuleA | NONE |
| ModuleB | NONE |
| ModuleC | NONE |
| ModuleD | NONE |
| ⋮ | ⋮ |

FIG. 20C
PUBLICATION IN MARKET SUSPENDED, IMAGE FORMING APPARATUS

| CONSTITUENT MODULE | |
|---|---|
| ModuleA | Internal HD URL/ModuleA-xxxx.nlf |
| ModuleC | High-Speed Net Storage URL/ModuleC-xxxx.nlf |
| ModuleB | Internal HD URL/ModuleB-xxxx.nlf |
| ModuleD | High-Speed Net Storage URL/ModuleD-xxxx.nlf |
| ⋮ | ⋮ |

DISTRIBUTION CONTROL APPARATUS, DISTRIBUTION CONTROL METHOD, AND NON-TRANSITORY COMPUTER-READABLE MEDIUM

BACKGROUND OF THE INVENTION

1. Field of the Invention

The present invention relates to a distribution control apparatus, a distribution control method, and a non-transitory computer-readable medium that control distribution of firmware of an image forming apparatus.

2. Description of the Related Art

In recent years, a technique to update firmware of an image forming apparatus by distributing/providing the firmware via the Internet has been proposed. At the same time, a service for storing and managing various types of content data for high-speed distribution over the Internet has also been proposed. This service utilizes a storage unit in a network for storing content data, which is also referred to as a net storage. A distribution server can perform high-speed distribution by utilizing the net storage. Furthermore, the distribution server controls data stored in the net storage by managing a status that enables distribution of firmware (hereinafter referred to as "publication in the market"). Firmware that has been determined to go out of use in the future is deleted from the net storage by suspending its publication in the market.

Meanwhile, there is a monitoring system for remotely monitoring the running states of peripheral apparatuses, such as an image forming apparatus. A technique to reserve an update of firmware of an image forming apparatus under the environment of the monitoring system has been proposed. With regard to reservation and instruction methods, for example, a reservation may be made by the monitoring system, or an instruction/reservation may be issued/made by the image forming apparatus.

There are various types of firmware, ranging from normal firmware that is used by an ordinary user on an image forming apparatus, to business firmware, individual firmware, and the like. Here, business firmware denotes firmware that is, for example, provided with additional functions to live up to demands from specific corporations. Individual firmware denotes firmware that has been modified for a specific failure and the like and released to a very limited extent, e.g., for specific corporations and offices. Some specific corporations have a demand to use a uniform version of individual firmware, in which case it is not uncommon to use the same version over an extended time period. In this case, there is a possibility that a specific version of individual firmware suddenly becomes necessary due to, for example, exchange of a platform of the image forming apparatus.

Also, with regard to a system for distributing contents in accordance with requests, a technique to set a period of validity and enable distribution of paid contents only within the set period has been proposed (see, for example, Japanese Patent Laid-Open No. 2002-259842).

As the types of image forming apparatuses supported by a distribution system have become diverse, numerous items of firmware are registered with the distribution system in many versions, resulting in the increase of the cost of a net storage. Furthermore, registration of many items of firmware has given rise to the trouble of selecting desired firmware from a list presented by the system.

In addition, there is a case where specific corporations using individual firmware wish to use a uniform version of individual firmware for a plurality of image forming apparatuses. For instance, there is a possibility that, after the elapse of an extended time period since the release of individual firmware, a version of firmware whose publication in the market has been suspended suddenly becomes necessary due to, for example, exchange of a platform of an image forming apparatus.

There has been a demand for an efficient firmware management/update method in the foregoing cases.

SUMMARY OF THE INVENTION

According to one aspect of the present invention, there is provided a distribution control apparatus that controls distribution of firmware to be mounted on an image forming apparatus in a network, comprising: a storage control unit configured to cause a first storage unit installed in the network to store different versions of firmware; a control unit configured to control, based on information of the different versions of firmware, publication and suspension of publication of the different versions of firmware; and a distribution unit configured to cause distribution of a publicized version of firmware from the first storage unit in accordance with a request, wherein the control unit causes deletion of a version of firmware whose publication is to be suspended from the first storage unit.

According to another aspect of the present invention, there is provided a distribution control method that controls distribution of firmware to be mounted on an image forming apparatus in a network, comprising: a storage control step of causing a first storage unit installed in the network to store different versions of firmware; a control step of controlling, based on information of the different versions of firmware, publication and suspension of publication of the different versions of firmware; and a distribution step of causing distribution of a publicized version of firmware from the first storage unit in accordance with a request, wherein the control step causes deletion of a version of firmware whose publication is to be suspended from the first storage unit.

According to another aspect of the present invention, there is provided a non-transitory computer-readable medium storing a program for causing a computer to function as: a storage control unit configured to cause a first storage unit installed in a network to store different versions of firmware to be mounted on an image forming apparatus; a control unit configured to control, based on information of the different versions of firmware, publication and suspension of publication of the different versions of firmware; and a distribution unit configured to cause distribution of a publicized version of firmware from the first storage unit in accordance with a request, wherein the control unit causes deletion of a version of firmware whose publication is to be suspended from the first storage unit.

The present invention can suppress the cost of a net storage and provide an efficient firmware management/update method.

Further features of the present invention will become apparent from the following description of exemplary embodiments (with reference to the attached drawings).

BRIEF DESCRIPTION OF THE DRAWINGS

FIG. 11 is a flowchart of a distribution server according to a fourth embodiment.

FIG. 12 shows examples of settings and firmware according to the first embodiment.

FIG. 16 shows a flow of a distribution system according to the fourth embodiment.

FIG. 17 shows a concept of downloading according to the first embodiment.

FIGS. 19A, 19B and 19C show examples of tables related to individual firmware according to the first embodiment.

FIGS. 20A, 20B and 20C show examples of tables related to individual firmware according to the second embodiment.

DESCRIPTION OF THE EMBODIMENTS

First Embodiment

The following describes embodiments of the present invention with reference to the drawings.

System Configuration

Figure 1:
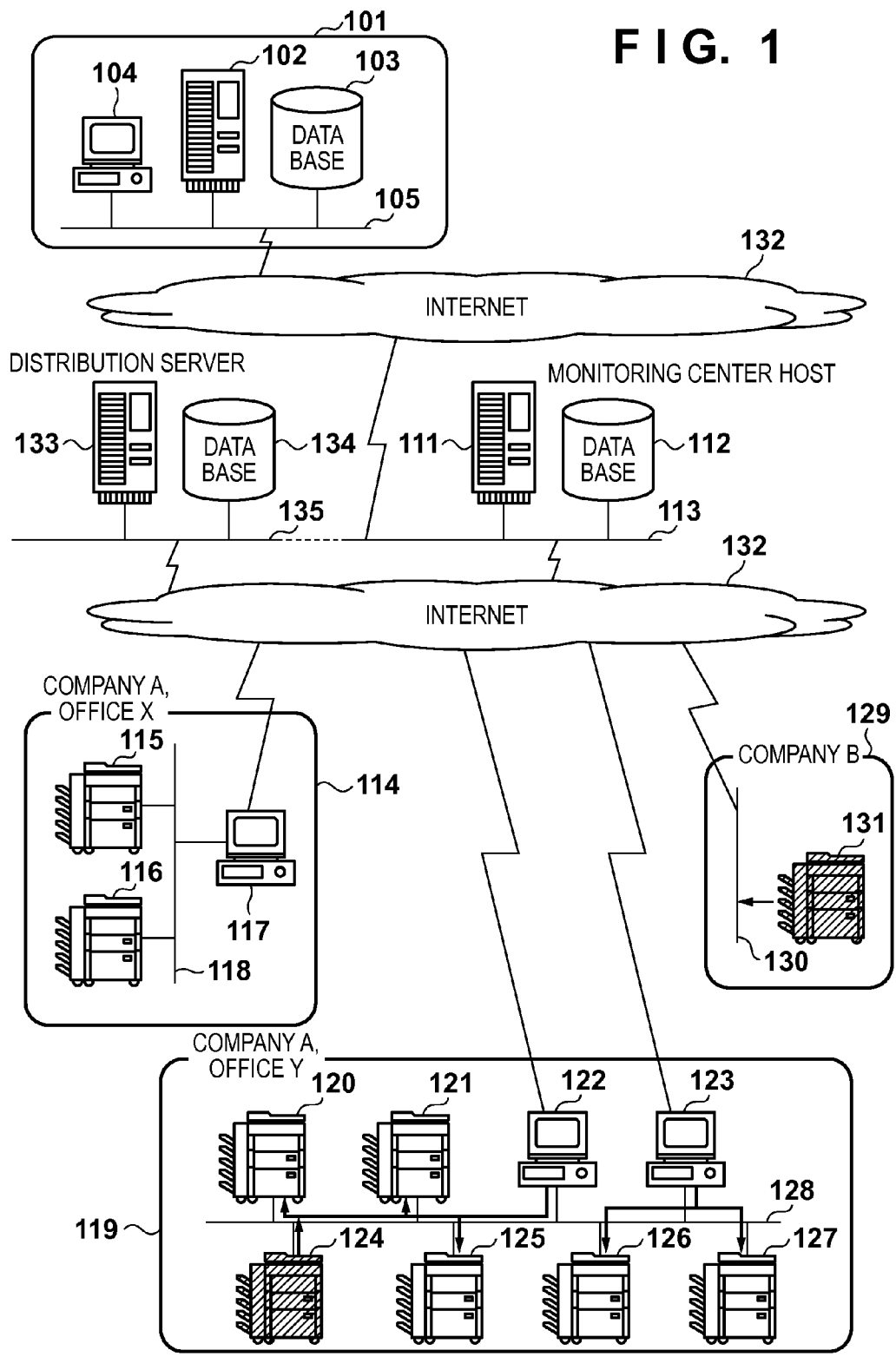
FIG. 1 shows an example of overall configurations of systems according to the invention of the present application.

FIG. 1 shows an example of overall configurations of systems according to the present embodiment. Systems at a plurality of locations are connected via a network. A system 101 includes a PC 104 that controls registration and modification of data with respect to a database 103, which is a storage unit. The PC 104 enables, for example, viewing of data by accesses a website provided by a monitoring center host 111. A host 102, the database 103, and the PC 104 included in the system 101 are connected by a LAN 105. It should be noted that the configurations of the systems shown in FIG. 1 serve as an example, and the systems are not limited to having these configurations. For example, the database 103 may physically exist inside the host 102. Alternatively, the database 103 may exist in another area via the Internet as long as it is accessible from the host 102. Furthermore, any apparatus may be made up of a plurality of apparatuses, or made up of a single apparatus.

The monitoring center host 111 will now be described. A database 112 serves as a history storage unit that accumulates information for monitoring image forming apparatuses, the running states of the image forming apparatuses, and the like. The monitoring center host 111 and the database 112 are connected by a LAN 113, and the LAN 113 is connected to the Internet. It should be noted that the database 112 may physically exist inside the monitoring center host 111. Furthermore, the database 112 may exist in another area via the Internet as long as it is accessible from the monitoring center host 111.

The monitoring center host 111 has a function of collecting, accumulating, and processing information of image forming apparatuses to be monitored or information indicating the running states from monitoring apparatuses 117, 122, 123 and from an image forming apparatus 131. The monitoring center host 111 also has a function of providing warning and the like to the outside depending on conditions.

A distribution server 133 will now be described. The distribution server 133, which is an information processing apparatus, serves as a distribution control apparatus that manages and controls distribution of firmware to be mounted on image forming apparatuses. A database 134 serves as a storage unit for accumulating firmware to be applied to image forming apparatuses. The distribution server 133 and the database 134 are connected by a LAN 135, and the LAN 135 is connected to the Internet. It should be noted that the database 134 may physically exist inside the distribution server 133. Alternatively, the database 134 may exist in another area via the Internet as long as it is accessible from the distribution server 133. The LAN 113 and the LAN 135 may be integrally formed, and the database 134 and the database 112 may share data.

FIG. 1 shows only one monitoring center host 111, one database 112, one distribution server 133, and one database 134. Alternatively, it is permissible to physically cause a plurality of apparatuses to execute distributed processing in order to distribute the load for collecting information from many image forming apparatuses and monitoring apparatuses, and for distributing firmware.

Configurations of customers' systems will now be described. FIG. 1 shows customer systems 114, 119, 129 as the environments of a plurality of customers. In the customer system 114 (office X of company A), the monitoring apparatus 117 monitors image forming apparatuses 115, 116 in a LAN 118 connected to the Internet 132. The monitoring apparatus 117 communicates with the monitoring center host 111 via the Internet 132. On the other hand, in the customer system 119 (office Y of company A), the monitoring apparatuses 122, 123 manage image forming apparatuses in a LAN 128. Specifically, the monitoring apparatus 122 monitors image forming apparatuses 120, 121, 124, 125, whereas the monitoring apparatus 123 monitors image forming apparatuses 126, 127.

In the customer system 129 (company B), the image forming apparatus 131, which is connected to a LAN 130 connected to the Internet 132, directly communicates with the monitoring center host 111 via the Internet 132. The image forming apparatus 131 has a monitoring function equivalent to that of the monitoring apparatuses 117, 122, 123, and transmits running information of itself to the monitoring center host 111.

It should be noted that the systems according to the present embodiment are based on the following premises. In communication via the Internet, protocols such as HTTP (Hyper Text Transfer Protocol) and SOAP (Simple Object Access Protocol) can be utilized. SOAP, which is based upon the XML (extensible markup language), is a protocol for calling up data and services of one computer from another computer. In the present example, SOAP is used over HTTP. In communication using SOAP, a SOAP message generated by adding supplementary information to an XML document is exchanged. Therefore, a computer supporting SOAP is provided with a SOAP message generation unit that generates a SOAP message and a SOAP message interpretation unit that interprets the SOAP message. In the present embodiment, state information of an image forming apparatus is transmitted to the monitoring center host 111 using a SOAP message.

Normally, the image forming apparatuses in company A communicate with the monitoring center host 111 via the monitoring apparatuses. Alternatively, the settings may be changed such that these image forming apparatuses can communicate directly with the monitoring center host without intermediation of the monitoring apparatuses, similarly to the image forming apparatus 131 installed in company B.

Hardware Configuration

Figure 2:
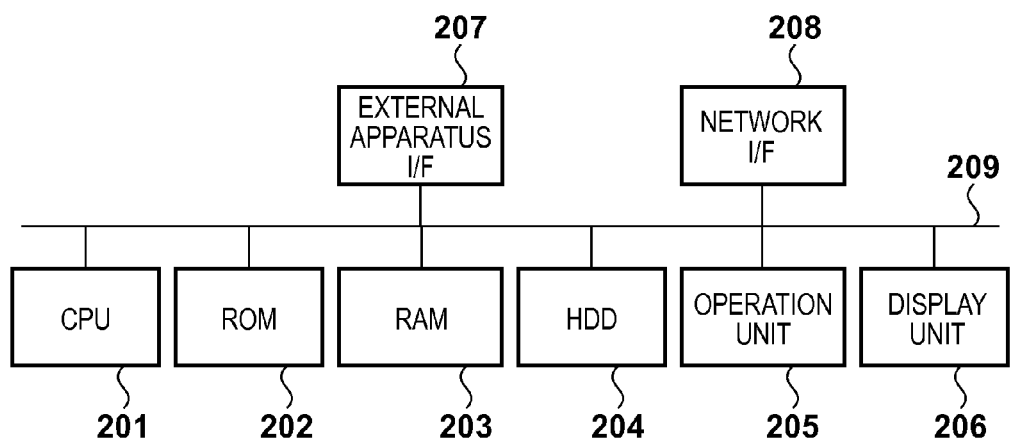
FIG. 2 shows an example of a hardware configuration of an information processing apparatus.

FIG. 2 shows an example of a hardware configuration of the monitoring center host 111. In the present embodiment, the distribution server 133, the host 102, the monitoring apparatuses 117, 122, 123, and the PC 104, which serves as information processing apparatuses, also have similar configurations.

In FIG. 2, a CPU 201 controls the entirety of the present apparatus. A ROM 202 stores programs and data related to processing of the present apparatus. A RAM 203 can electrically store and rewrite transitory data related to processing of the present apparatus. An HDD 204 stores, for example, programs and data related to processing of the present apparatus, transitory data, information related to image forming apparatuses to be monitored, and information collected from image forming apparatuses. For example, running information is stored in the HDD 204.

Figure 4:
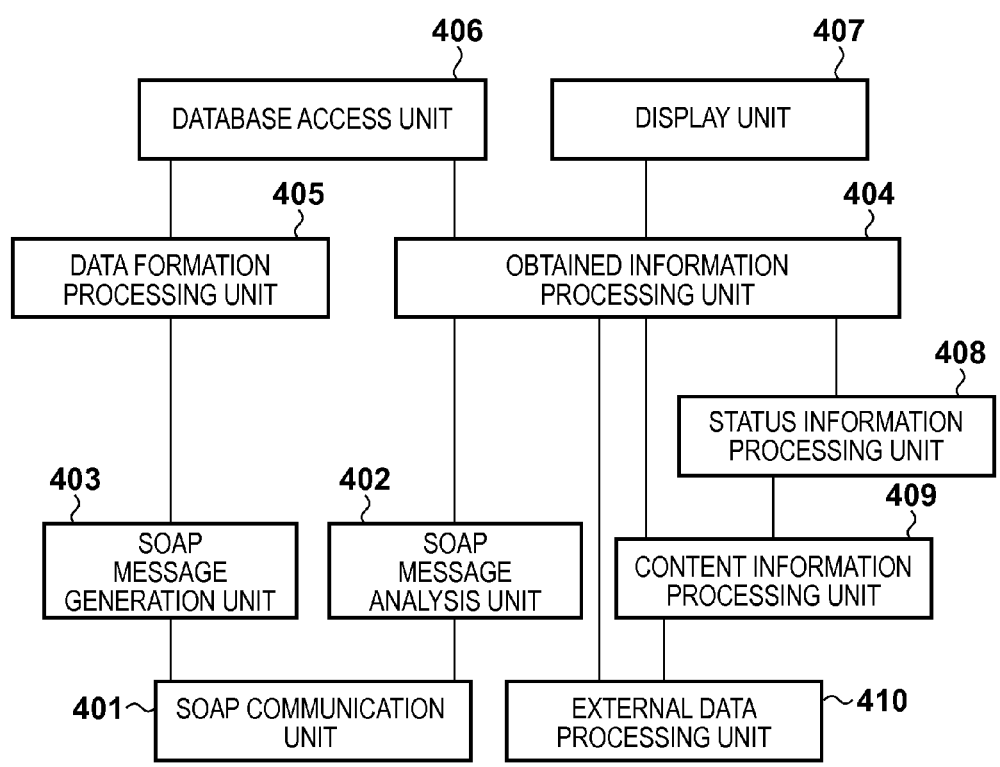
FIG. 4 shows an example of a software configuration of a monitoring center host and a distribution server.

In the monitoring center host 111 and the distribution server 133, a program related to processing shown in FIG. 4 is held in the HDD 204. This program uses the RAM 203 as a transitory storage area, and is called up and executed by the CPU 201.

An operation unit 205 is a keyboard that accepts input of instructions to the present apparatus. A display unit 206 displays operational conditions of the present apparatus and information output from programs operating on the present apparatus. A network I/F 208 connects to a LAN and the Internet via a network and exchanges information with the outside. An external apparatus I/F 207 connects to external storage apparatuses and the like. The above constituent elements are connected by a system bus 209 and exchange data with one another.

Figure 3:
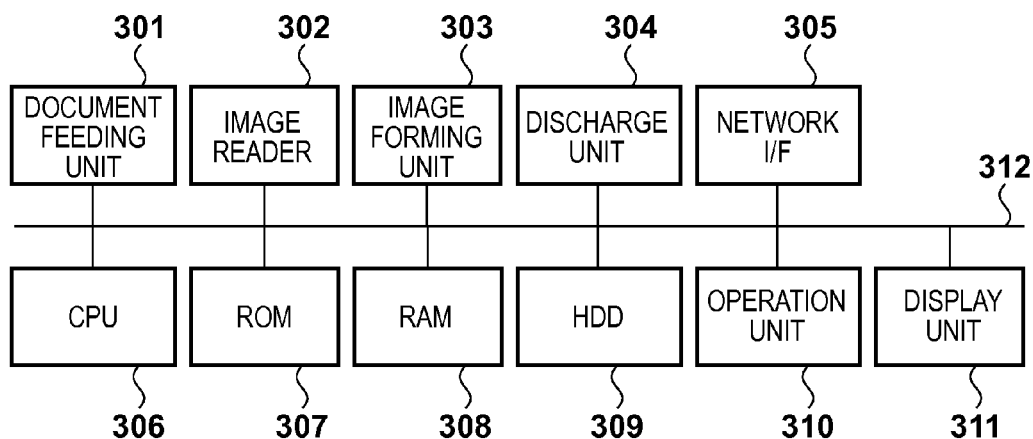
FIG. 3 shows an example of a hardware configuration of an image forming apparatus.

FIG. 3 shows an example of a hardware configuration of the image forming apparatuses 115, 116, 120, 121, 124 to 127, and 131. Examples of an image forming apparatus include a multifunction peripheral integrating printer and facsimile functions, a printer that executes print processing (including an electrophotographic printer and an inkjet printer), a scanner, and a facsimile machine. FIG. 3 shows a configuration of a multifunction peripheral as one example of an image forming apparatus.

An image reader 302 reads a document conveyed by a document feeding unit 301. The image reader 302 and an image forming unit 303 covert data of the read document and data received via a network into an image for printing, and print/output the converted image. A discharge unit 304 discharges sheets that have been printed/output, and applies sort/staple processing to the discharged sheets. A network I/F 305 connects to a LAN and the Internet and exchanges information with the outside. A CPU 306 controls the entirety of the present apparatus. The image forming apparatuses monitor operational states of themselves, and when a specific event, such as a failure, has occurred, transmit state information indicating that state to a predetermined destination. The destination is, for example, the monitoring center host 111, a monitoring apparatus, and the like.

A ROM 307 stores programs and data related to processing of the present apparatus. A RAM 308 electrically stores transitory data related to processing of the present apparatus. An HDD 309 stores, for example, programs and data related to processing of the present apparatus, transitory data, and user data transmitted to the present apparatus.

Figure 5:
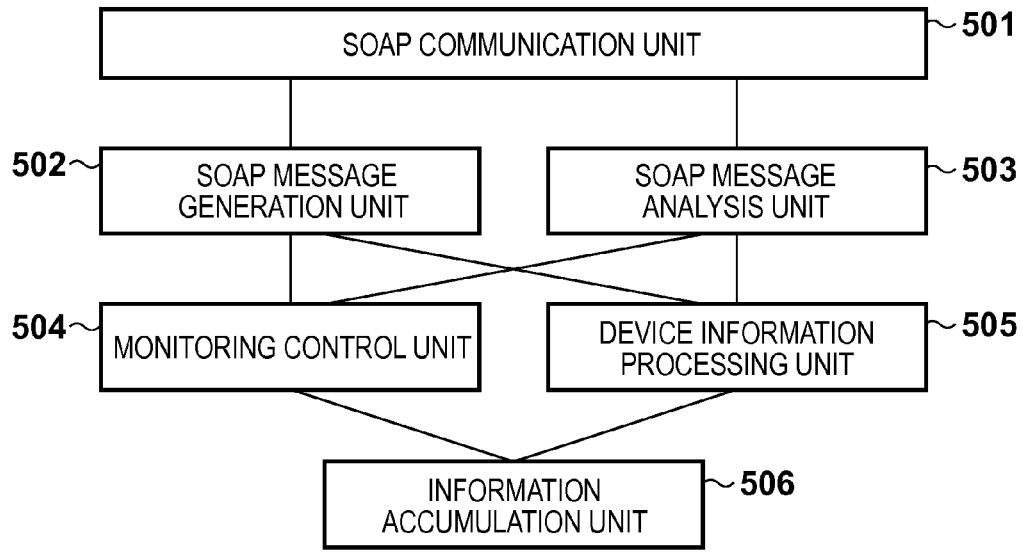
FIG. 5 shows an example of a software configuration of a monitoring apparatus and an image forming apparatus.

In the image forming apparatuses, a program related to a software configuration shown in FIG. 5 is held in the HDD 309. This program uses the RAM 308 as a transitory storage area, and is called up and executed by the CPU 306.

An operation unit 310 accepts input of instructions to the present apparatus from a user. A display unit 311 displays operational conditions of the present apparatus and information related to operations on the operation unit 310. The above constituent elements are connected by a system bus 312 and exchange data with one another.

It should be noted that, in the image forming apparatus 131 that itself has a function of transmitting information for monitoring, programs and data related to processing for transmitting monitoring data are held in the ROM 307 or the HDD 309.

Software Configuration

FIG. 4 shows an example of a software configuration of the distribution server 133. Constituent units of the software are realized by the CPU 201 executing programs thereof held in the ROM 202. The RAM 203 is used for transitory storage of obtained data.

A SOAP communication unit 401 passes SOAP data that has been received from the image forming apparatus 131 via the network I/F 208 to a SOAP message analysis unit 402. It also transmits SOAP data generated by a SOAP message generation unit 403 to the image forming apparatus 131 via the network I/F 208.

An obtained information processing unit 404 stores SOAP data into databases via a database access unit 406, either in its original form as data from the SOAP message analysis unit 402, or after processing the SOAP data. The obtained information processing unit 404 also analyzes firmware data obtained from the database access unit 406, and executes processing for determining whether a download request has been made by the image forming apparatus 131 or the monitoring center host 111 (mode-related processing). The obtained information processing unit 404 further makes a determination about conditions for publication in the market.

A data formation processing unit 405 obtains data from the database access unit 406, processes the obtained data, and passes the processed data to the SOAP message generation unit 403. A display unit 407 executes display processing and input/output processing for an operator. A status information processing unit 408 processes and controls status information of firmware in the distribution server 133. A content information processing unit 409 processes table information related to distribution of firmware contents. An external data processing unit 410 executes processing for a net storage via the network I/F 208. For example, the external data processing unit 410 executes storage control for registering and storing distributable firmware into a net storage.

FIG. 5 shows a software configuration of an image forming apparatus related to communication. Constituent units of the software are realized by the CPU 306 executing programs thereof held in the ROM 307.

A SOAP communication unit 501 passes SOAP data that has been received from the monitoring center host 111 and the distribution server 133 via the network I/F 305 to a SOAP message analysis unit 503. The SOAP communication unit 501 also transmits SOAP data generated by a SOAP message generation unit 502 to the monitoring center host 111 and the distribution server 133 via the network I/F 305.

A monitoring control unit 504 updates monitored image forming apparatus information that is held in the ROM 307 via an information accumulation unit 506 and obtains information of the image forming apparatuses 115, 116.

A device information processing unit 505 controls an update operation of the image forming apparatus and accumulates instruction information into the ROM 307 via the information accumulation unit 506. Data that has been accumulated into the ROM 307 via the information accumulation unit 506 is passed to the SOAP message generation unit 502 via the device information processing unit 505 and transmitted to the monitoring center host 111 and the distribution server 133 via the network I/F 305.

Processing Structure

The following describes processing flows according to the present embodiment with reference to FIGS. 7, 8, 12 to 15, and 17 to 19.

Figure 13:
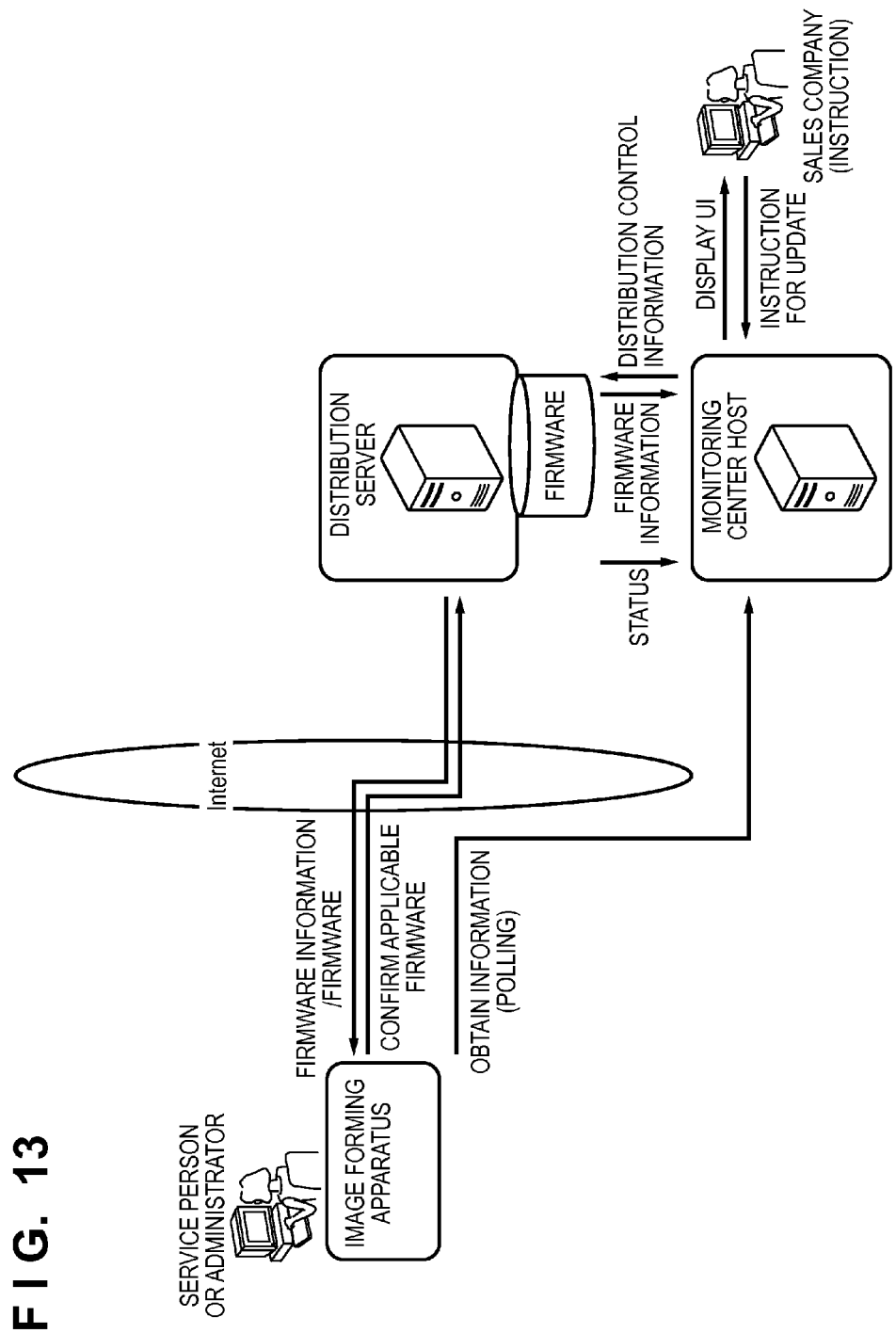
FIG. 13 shows a flow of an entire distribution system according to the first embodiment.

First, with reference to FIG. 13, a description is given of a general flow of distribution involving the image forming apparatus 124 and the distribution server 133 shown in FIG. 1.

With the hardware and software configurations described above, information is exchanged among the distribution server 133, the monitoring center host 111 and the image forming apparatus, and firmware is distributed in accordance with a request. Distribution of firmware may be performed based on an update instruction issued from the monitoring center host 111, or on an instruction issued from a service person, an administrator, and the like from the location of the image forming apparatus via a screen operation.

Figure 14:
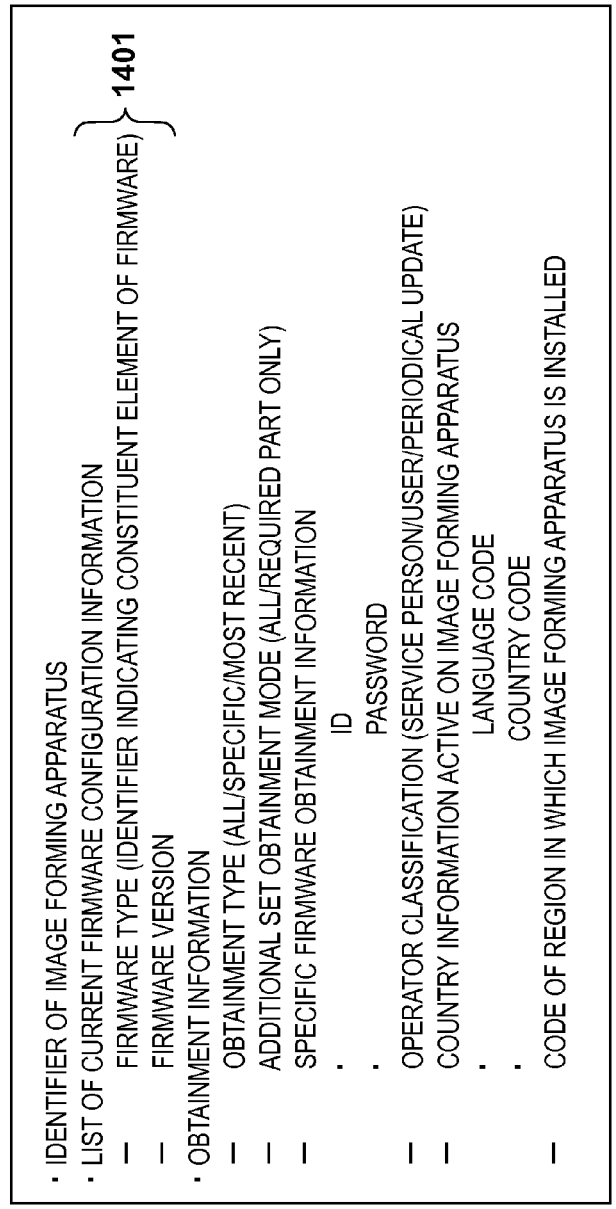
FIG. 14 shows an example of SOAP data according to the first embodiment.
Figure 15:
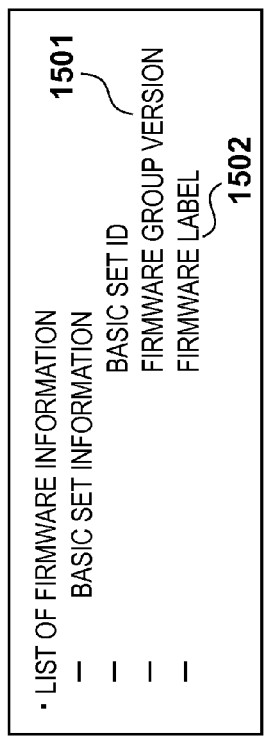
FIG. 15 shows an example of SOAP data according to the first embodiment.

If the distribution of firmware is based on an instruction from the monitoring center host 111, confirmation of applicable firmware is made with the distribution server 133 at designated time. On the other hand, if the distribution of firmware is based on a screen operation on the image forming apparatus, confirmation of applicable firmware is made by pressing a button for confirmation of applicable firmware (not shown in the drawings). Confirmation of applicable firmware is processing for transmitting current firmware configuration information of the image forming apparatus to the distribution server 133 so as to confirm whether or not there is distributable firmware among items of firmware registered with the distribution server 133. More specifically, SOAP data shown in FIG. 14 is transmitted from the image forming apparatus to the distribution server 133. The image forming apparatus transmits current firmware configuration information 1401, and the distribution server 133 identifies a current firmware version and applicable firmware based on the transmitted information. If there is applicable firmware, SOAP data shown in FIG. 15 is returned to the image forming apparatus. In this SOAP data returned, a firmware group version 1501 and a firmware label 1502 of the applicable firmware are listed. Thereafter, by selecting the listed information, downloading 1320 of the firmware is performed and the firmware is updated.

Figure 18:
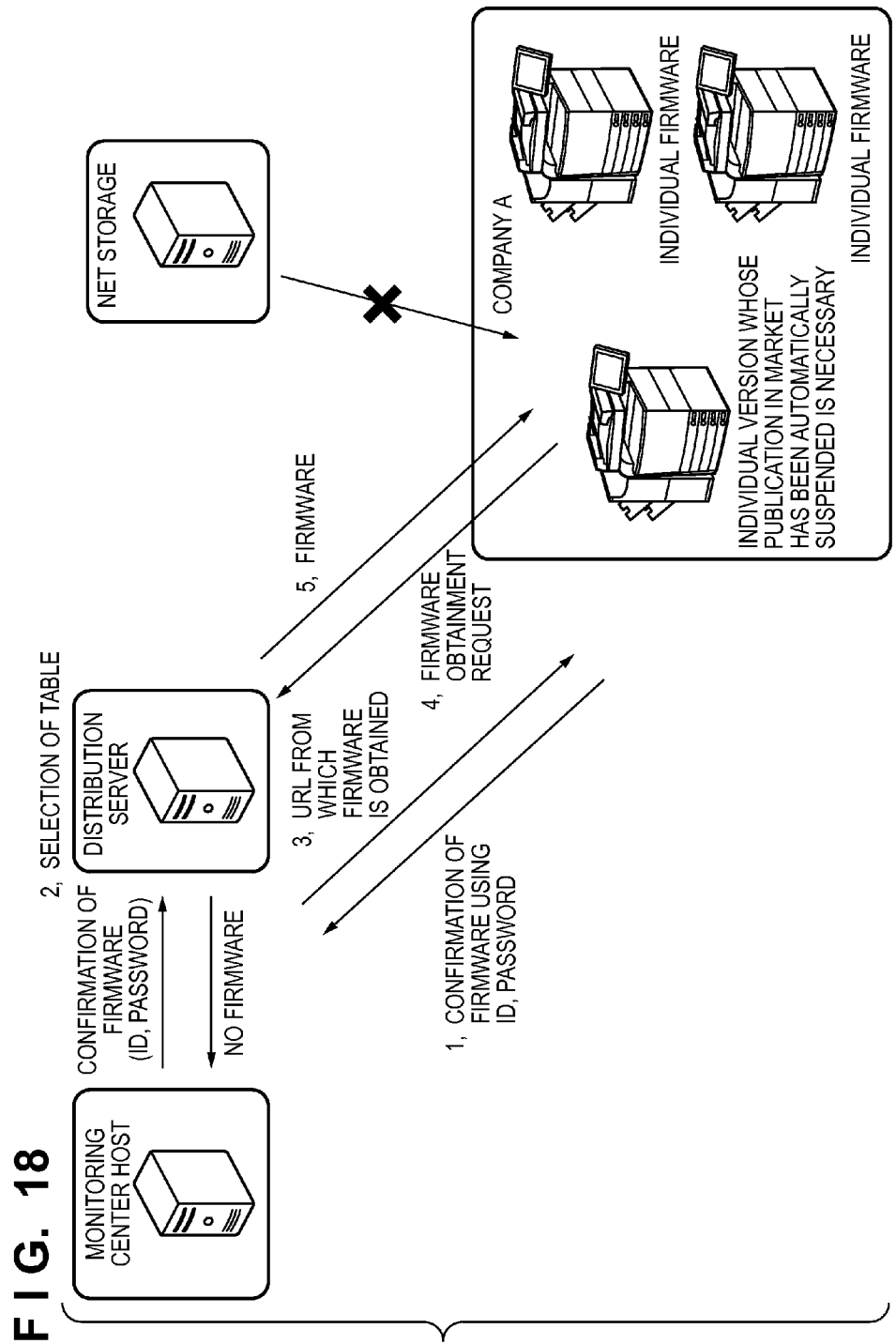
FIG. 18 shows a flow of the distribution system according to the first embodiment.

With reference to FIG. 18, the following describes downloading of individual firmware performed by an image forming apparatus according to the present embodiment. While confirmation of applicable firmware is made by an image forming apparatus as has been stated earlier, confirmation of individual firmware is made using an ID and a password. Individual firmware requires an ID and a password because it is designed for specific users (corporations). Upon the occurrence of firmware confirmation, the distribution server 133 selects a table so as to return a URL (Uniform Resource Locator) related to a distribution source of firmware, which will be described later. The distribution server 133 returns a URL described in the selected table to the image forming apparatus. The image forming apparatus makes a firmware obtaining request to that URL representing the distribution source of the firmware, and the distribution source that has accepted the request distributes the firmware. FIG. 18 shows an example in which an internal hard disk drive provided in the distribution server 133 is used as the distribution source represented by the URL. It will be assumed that the internal hard disk drive is inexpensive but has a lower performance than a net storage installed in a network in terms of functions, such as a downloading speed (distribution speed). Herein, the net storage represents a first storage unit, and the internal hard disk drive is also referred to as a second storage unit.

Processing Flows

Processing flows of the present invention will now be described with reference to FIGS. 7 and 8. The distribution server 133 executes the following processing at every preset time. Here, an interval of processing may be managed by an administrator of the distribution server 133 in a changeable manner, or may be predefined by a specific value. The following processing flows are realized by the CPU 201 of the distribution server 133 reading and executing programs stored in the ROM 202 and the like.

(Processing Flow Related to Automatic Suspension of Publication in Market)

In step S701, the database access unit 406 executes processing for obtaining firmware information related to firmware that has already been registered, publicized in the market, and expanded in a net storage. The present processing is for obtaining information shown in FIG. 12 that will be necessary in the upcoming determinations, that is to say, a date of publication in the market, a date of last access, a firmware type, and whether it is not allowed to automatically suspend publication of the firmware in the market. The date of publication in the market indicates the date when distribution was enabled. The date of last access indicates the date when the firmware was accessed (or distributed) most recently. It should be noted that the setting values shown in FIG. 12 serve as examples, and other items may be included. Furthermore, in the present embodiment, it will be assumed that the setting related to whether or not to allow automatic suspension of publication in the market is configured at the time of registration of the firmware using radio buttons 601 shown in FIG. 6.

It should be noted that "publication in market automatically suspended" denotes a situation in which distribution of firmware is disabled by a distribution system automatically suspending publication in the market (publication in market suspended) in accordance with information related to the firmware when the status of the firmware is "publicized in market". In the example described below, determinations are made under the assumption that firmware version "V1.0", which is indicated by data 1202 shown in FIG. 12, is regarded as target firmware. Therefore, in the present case, the following information is obtained: "2012.1.1" as the date of publication in the market, "2012.2.1" as the date of last access, "normal" as the firmware type, and "allowed" as the automatic suspension of publication in the market. Furthermore, in the example described below, setting values 1201 shown in FIG. 12, which have been presented in advance, are used. It will be assumed here that setting values are configured for a time period of publication in the market, a time period that has elapsed since the date of last access, a firmware type, and a target for which a determination is made as to whether or not it is of the most recent version.

In step S702, the obtained information processing unit 404 determines whether or not a set time period has elapsed since the date of publication of the target firmware in the market. Specifically, whether or not a preset time period has elapsed is determined by comparing the current date with the date of publication in the market. For example, assume that the current date is "2012.11.1" and the preset time period is "six months". In this case, it is determined that the set time period has elapsed (YES of step S702), and the present processing flow proceeds to step S703. If the set time period has not elapsed (NO of step S702), the present processing flow is ended.

In step S703, the obtained information processing unit 404 determines whether or not a set time period has elapsed since the date of last access to the target firmware. Specifically, whether or not a preset time period has elapsed is determined by comparing the current date with the date of last access. The date of last access denotes the most recent date among the dates and times when the target firmware was accessed for any purpose, such as change of settings and downloading. For example, assume that the date of last access is "2012.2.1", the current date is "2012.11.1", and the preset time period is "six months". In this case, it is determined that the set time period has elapsed (YES of step S703), and the present processing flow proceeds to step S704. If the set time period has not elapsed (NO of step S703), the present processing flow is ended.

In step S704, the obtained information processing unit 404 determines whether or not the firmware type of the target firmware is a predetermined type. Specifically, whether or not the target firmware is of a preset firmware type is determined. For example, the firmware type configured as the setting values 1201 in FIG. 12 is "normal, individual", while the type of the target firmware is "normal". As a result, it is determined that the target firmware is of the predetermined type (YES of step S704), and the present processing flow proceeds to step S705. If the target firmware is not of the set type (NO of step S704), the present processing flow is ended.

In step S705, the obtained information processing unit 404 determines whether or not the target firmware is excluded from a determination regarding the most recent version. In this determination, for a predetermined type of firmware, the present processing flow proceeds to steps S707 to S710 whether or not the firmware is of the most recent version. It will be assumed here that the predetermined type is "individual". As the type of firmware version "V1.0" is "normal", it is determined that the target firmware is not of the predetermined type (NO of step S705), and the present processing flow proceeds to step S706. If the target firmware is of the predetermined type (YES of step S705), the present processing flow proceeds to step S707.

In step S706, the obtained information processing unit 404 determines whether or not the target firmware is of the most recent version. Here, as version "V1.1" of corresponding firmware has already been provided as indicated by 1203 of FIG. 12, it is determined that the target firmware is not of the most recent version (NO of step S706), and the present processing flow proceeds to step S707. If the target firmware is of the most recent version (YES of step S706), the present processing flow is ended.

In step S707, the obtained information processing unit 404 determines whether or not the target firmware has a special role. In some cases, when updating firmware from one version to another version, the version upgrade cannot be performed without a stepwise update involving yet another special version for absorbing configuration differences and the like. Herein, a specific version of firmware having such a role is referred to as "firmware with a special role", and it is necessary to deter suspension of publication in the market for this firmware with a special role even if other conditions are fully satisfied.

Figure 6:
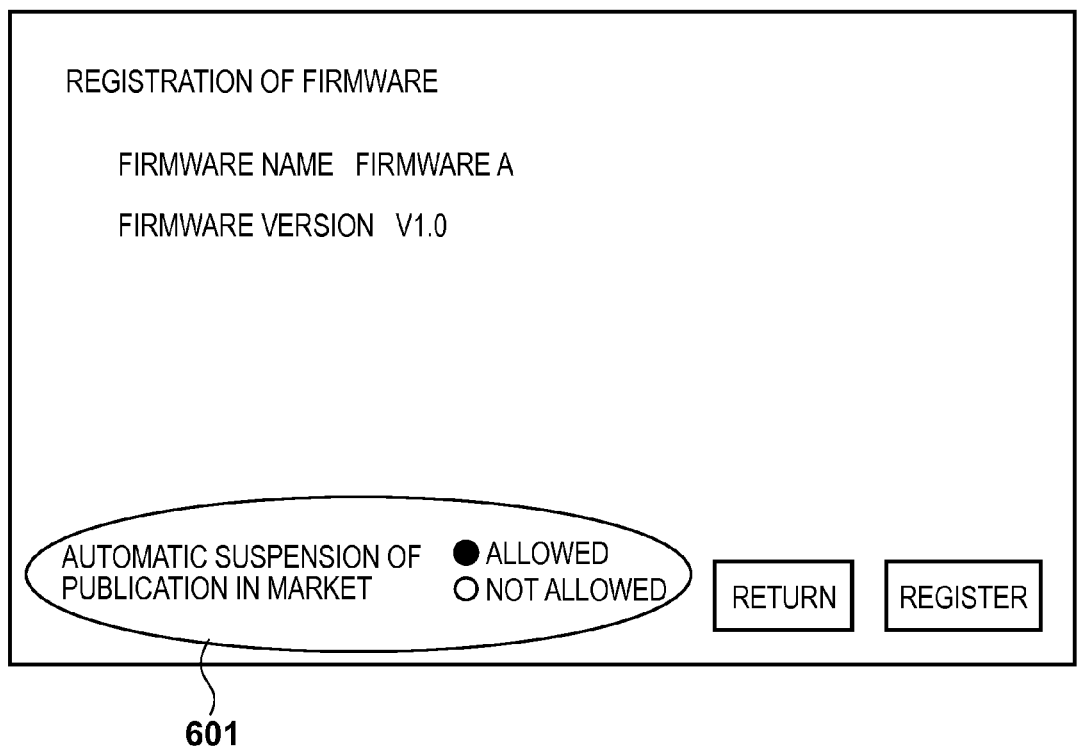
FIG. 6 shows an example of a UI provided by a distribution server.

At the time of registration of firmware with the distribution server 133, the display unit 407 sets whether or not to allow automatic suspension of publication in the market on a per-firmware basis using the radio buttons 601 shown in FIG. 6. If firmware to be registered has a special role, a flag to that effect is set so as to exclude the firmware from targets of automatic suspension of publication in the market, thereby making it possible to deter suspension of its publication in the market even if other conditions are fully satisfied. In the present example, as indicated by 1202 of FIG. 12, the automatic suspension of publication in the market is "allowed" for the target firmware, and therefore it is determined that the target firmware does not have a special role (NO of step S707), and the present processing flow proceeds to step S708. If the target firmware has a special role (YES of step S707), the present processing flow is ended.

In step S708, the external data processing unit 410 executes net storage deletion processing. As it has been determined that automatic suspension of publication in the market is allowed for the target firmware, the external data processing unit 410 first requests the net storage to delete data of a registered firmware group. After the deletion of firmware in this net storage has been ended normally, the status information processing unit 408 executes status change processing in step S708. This is processing for changing the status of the target firmware managed in the distribution server 133. Status information of the target firmware, which was "publicized in market" thus far, is changed to "publication in market suspended".

In step S710, the content information processing unit 409 executes reference table rewrite processing. A reference table is used in determining a URL to be returned in response to access from an image forming apparatus and the monitoring center host 111 in accordance with the status. Specifics of the reference table will be described later with reference to FIGS. 17, 19A, 19B and 19C. This marks the end of the present processing flow.

(Processing for Individual Firmware)

As has been stated earlier, there is a case where specific corporations using individual firmware wish to use a uniform version of individual firmware for a plurality of image forming apparatuses. With reference to FIGS. 8, 17 and 18, the following describes a flow according to the present embodiment for the case where publication of a desired version of individual firmware in the market has been suspended.

It will be assumed that company A, which uses individual firmware, has made a download request in order to use the individual firmware, as shown in FIG. 18. The distribution server 133 starts processing shown in FIG. 8 upon receiving a request via the SOAP communication unit 401.

In step S801, the SOAP message analysis unit 402 determines whether or not the received request is a download request. If the received request is the download request (YES of step S801), the present processing flow proceeds to step S802. If the received request is not the download request (NO of step S801), the distribution server 133 executes processing corresponding to the received request in step S812. Then, the present processing flow is ended.

In step S802, the obtained information processing unit 404 determines whether or not the requested firmware is individual firmware. If the requested firmware is individual firmware (YES of step S802), the present processing flow proceeds to step S803 so as to execute upcoming special processing in accordance with a status and a mode. If the requested firmware is not individual firmware (NO of step S802), the present processing flow proceeds to step S812.

In step S803, the status information processing unit 408 executes status obtainment processing. This is processing for obtaining a current status of the firmware for which the download request has been made, which is shown in FIG. 17. One of "publicized in market" or "publication in market suspended" is obtained as the status.

In step S804, the status information processing unit 408 determines whether or not the status is "publicized in market". As shown in FIG. 18, in the case of individual firmware whose publication in the market has been automatically suspended, it is determined that the status is not "publicized in market" (NO of step S804), and the present processing flow proceeds to step S805. If the status is "publicized in market" (YES of step S804), the present processing flow proceeds to step S808.

In step S805, the status information processing unit 408 determines whether or not the status has been automatically changed to suspension of publication in the market through processing of the distribution server 133. That is to say, it determines whether or not the status of the target firmware has been changed to "publication in market suspended" through the processing of FIG. 7 without any instruction from a user. If the status has been automatically changed to suspension of publication in the market (YES of step S805), the present processing flow proceeds to step S806. If the status has not been automatically changed through processing of the distribution server 133 (NO of step S805), the present processing flow proceeds to step S811.

In step S806, the obtained information processing unit 404 executes processing for obtaining information of a mode. This mode indicates that the received request is a download request from an image forming apparatus, or that the received request is a download request from the monitoring center host. Information indicating whether downloading is enabled or disabled depending on a relationship between a mode and a status is defined as shown in FIG. 17. It will be presumed here that the mode indicates a download request from the image forming apparatus.

In step S807, the obtained information processing unit 404 determines whether or not the request is from the image forming apparatus based on the obtained information of the mode. In the present example, it is determined that the request is from the image forming apparatus (YES of step S807), and the present processing flow proceeds to step S809. If the request is not from the image forming apparatus (in other words, if the request is from the monitoring center host) (NO of step S807), the present processing flow proceeds to step S811.

In step S809, the content information processing unit 409 executes processing for referring to a table related to the internal hard disk drive of the distribution server 133. Through this processing, settings are configured such that a table defining the low-speed but inexpensive internal hard disk drive of the distribution server 133 as a distribution source of constituent modules of the firmware (FIG. 19C) is referred to.

In step S810, the data formation processing unit 405 executes download processing. First, a URL to be accessed by the image forming apparatus is returned to the distribution server 133. A value of the table (FIG. 19C) is returned as a URL with which a firmware obtainment request (1804) of FIG. 18 is to be made. Then, the internal hard disk drive is accessed using the URL actually returned, and desired firmware is obtained.

In step S808, the content information processing unit 409 executes processing for referring to a table related to a net storage. Here, settings are configured such that a table shown in FIG. 19A is referred to. Thereafter, in step S810, the data formation processing unit 405 accesses the net storage using a URL of the net storage (FIG. 19A), and downloads desired firmware.

There are a case where publication of firmware in the market is suspended by an instruction issued from an operator via the display unit 407, and a case where publication of firmware in the market is automatically suspended by the distribution server 133. In the former case, publication in the market is suspended because, for example, a failure has been discovered in the firmware, and therefore downloading is disabled regardless of the request.

If the request has been made by the image forming apparatus (that is to say, if the mode indicates "image forming apparatus"), downloading of the requested firmware is enabled in consideration of, for example, the possibility that the requested firmware has suddenly become necessary due to exchange of a platform and the like. On the other hand, if the request has been made by the monitoring center host 111 (that is to say, if the mode indicates "monitoring center host"), the request pertains to downloading associated with mass distribution and does not require immediacy, and therefore downloading of the requested firmware is disabled.

Hence, if publication in the market has not been automatically suspended (NO of step S805), or if the mode does not indicate the image forming apparatus (NO of step S807), the data formation processing unit 405 executes processing for disabling downloading in step S811. This is processing for returning a notification indicating that downloading is disabled to the image forming apparatus in response to the download request from the image forming apparatus. In other words, as shown in a table of FIG. 19B, there is no designation of a URL representing a distribution source of firmware.

Through the above-described processing sequence, even when publication in the market has been suspended, a download request made by an image forming apparatus for individual firmware enables low-speed downloading from the inexpensive internal hard disk drive provided in the distribution server 133.

Second Embodiment

The following describes, as a second embodiment, an example in which a change is made to a URL representing a distribution source corresponding to a download request for individual firmware whose publication in the market is being suspended in accordance with a constituent module. This operation will be described with reference to FIGS. 9, 20A to 20C, and 21.

FIGS. 20A to 20C show tables that are used in downloading individual firmware in the present embodiment. It should be noted that, compared with FIGS. 19A to 19C according to the first embodiment, only a structure of FIG. 20C differs.

Figure 9:
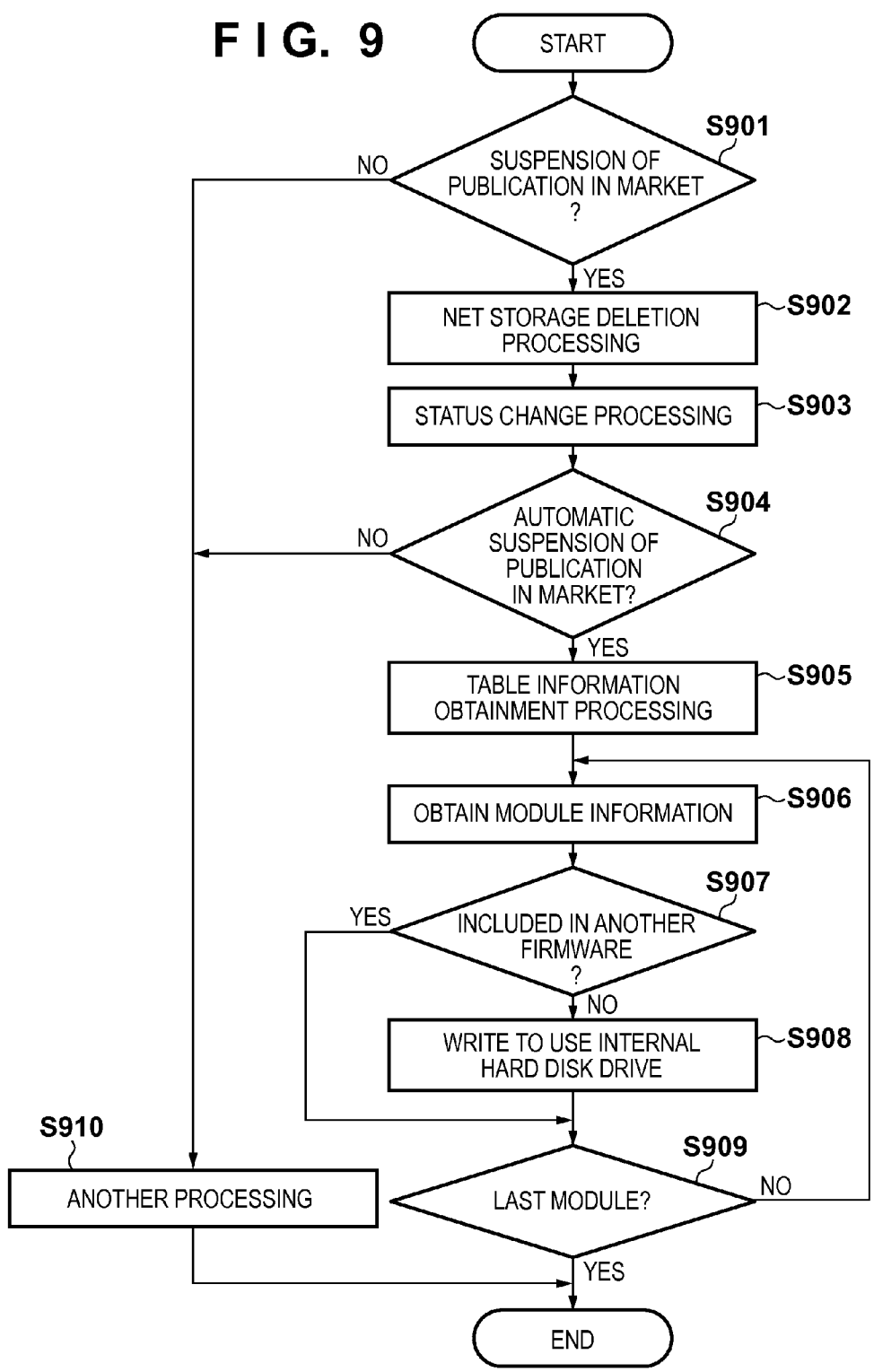
FIG. 9 is a flowchart of a distribution server according to a second embodiment.

A processing flow of FIG. 9 is started when the distribution server 133 receives some sort of request.

In step S901, the status information processing unit 408 determines whether or not the received request is a request for suspending publication in the market. If the received request is the request for suspending publication in the market (YES of step S901), the present processing flow proceeds to step S902. If the received request is not the request for suspending publication in the market (NO of step S901), the distribution server 133 executes processing corresponding to the received request in step S910. Then, the present processing flow is ended. In step S902, the external data processing unit 410 executes net storage deletion processing. This processing is similar to the status change processing (step S709) shown in FIG. 7. Thereafter, in step S902, the status information processing unit 408 executes status change processing. Specifically, target firmware in a net storage is deleted, and a status of the target firmware is changed to "publication in the market suspended".

In step S904, the status information processing unit 408 determines whether or not the status has been updated to indicate suspension of publication in the market through processing of the distribution server 133 for automatically suspending publication in the market. This is processing for determining whether the update of the status is attributed to automatic suspension of publication in the market through processing of the distribution server 133, or to suspension of publication in the market through a user operation. If it has been determined that the update of the status is attributed to automatic suspension of publication in the market (YES of step S904), the present processing flow proceeds to step S905. If the update of the status is attributed to suspension of publication in the market through the user operation (NO of step S904), processing corresponding to the accepted operation is executed in step S910. Then, the present processing flow is ended.

Figure 21:
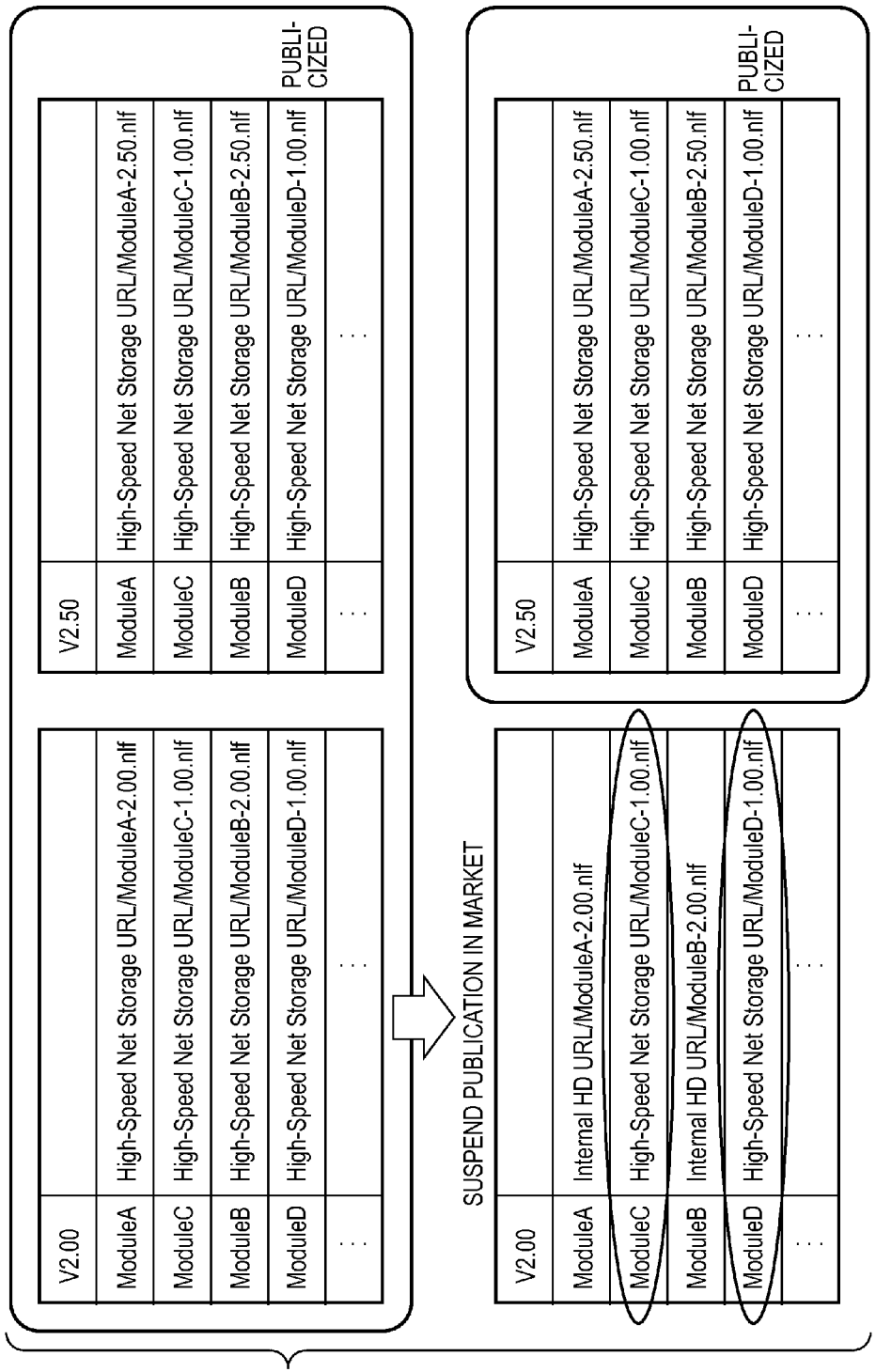
FIG. 21 shows examples of tables related to individual firmware according to the second embodiment.

In step S905, the content information processing unit 409 executes table information obtainment processing. This is processing for obtaining, via the database access unit 406, tables of all constituent modules that constitute firmware (FIG. 21). In step S906, the content information processing unit 409 obtains, from the obtained tables, information of one constituent module and information including a distribution source thereof (URL).

In step S907, the content information processing unit 409 determines whether or not firmware corresponding to the information obtained in step S906 is included in discrete constituent modules that constitute firmware that has been registered with the net storage and publicized in the market. For example, referring to FIG. 21, ModuleA and ModuleB of firmware V2.00, whose publication in the market has been suspended, are included in firmware V2.50 that is being publicized in the market. If included in another firmware (YES of step S907), the content information processing unit 409 does not perform writing to use the internal hard disk drive so as to leave a reference destination of the net storage as-is, and then proceeds to step S909. If not include in another firmware element (NO of step S907), the content information processing unit 409 performs writing to use the internal hard disk drive in step S908. For example, referring to FIG. 21, ModuleC and ModuleD of the firmware V2.00, whose publication in the market has been suspended, are not included in the firmware V2.50. Therefore, URLs of the tables are set so as to download from the internal hard disk drive of the distribution server 133.

Thereafter, in step S909, whether or not the tables obtained in step S905 include any unprocessed constituent module of firmware is confirmed. If there are unprocessed constituent modules (NO of step S909), the present processing flow returns to step S906 so as to execute processing for updating information in the tables sequentially for the constituent modules. If processing has been completed for all constituent modules that constitute firmware (step S909), the present processing flow is ended.

In the above-described manner, downloading is enabled by changing a distribution source in accordance with conditions of publication of constituent modules of firmware.

Third Embodiment

In a third embodiment, individual firmware is automatically publicized in the market in response to a download request for the individual firmware, and high-speed downloading from a net storage is enabled when the same request is made from then on.

Figure 10:
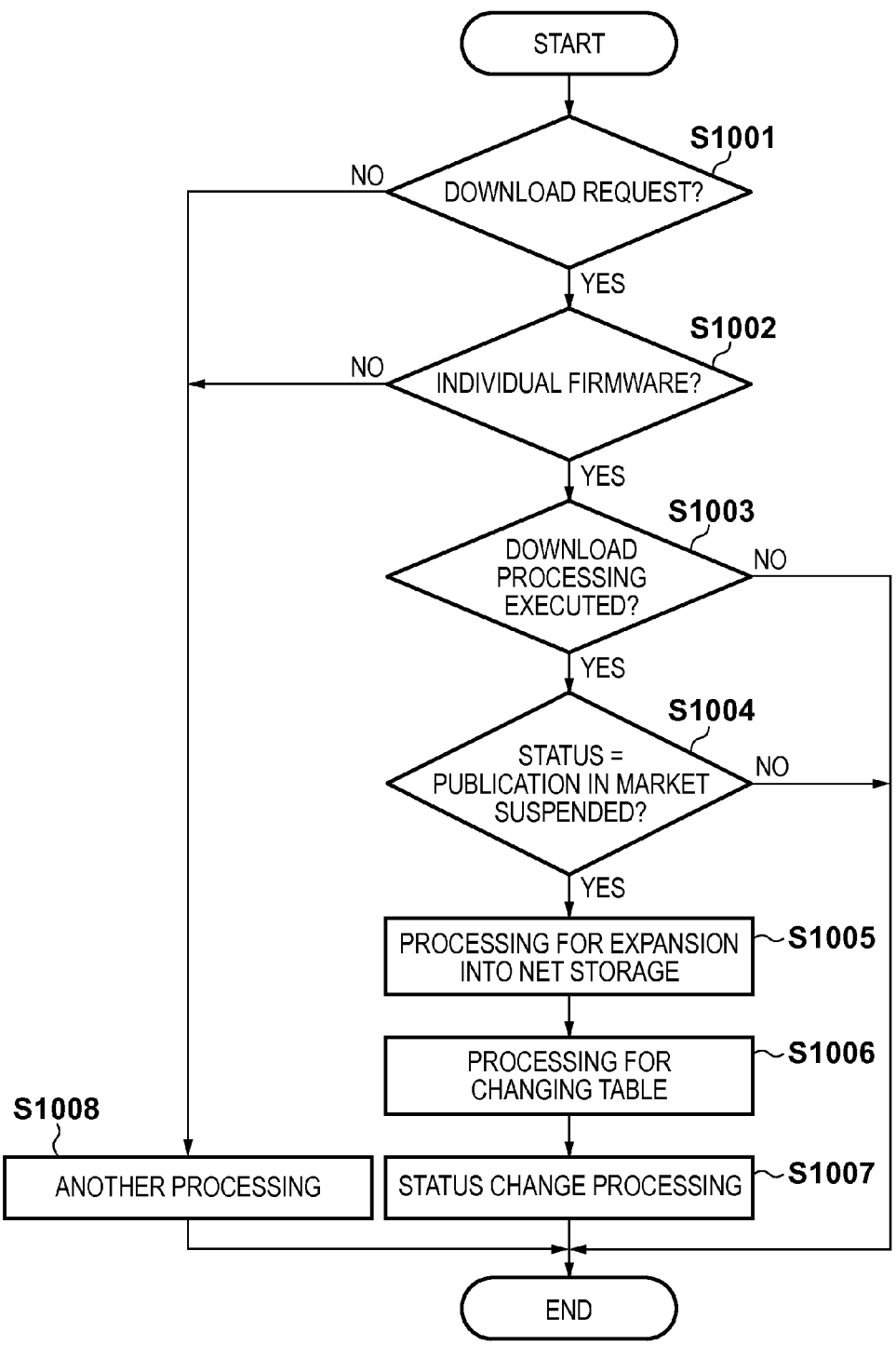
FIG. 10 is a flowchart of a distribution server according to a third embodiment.
Figure 22:
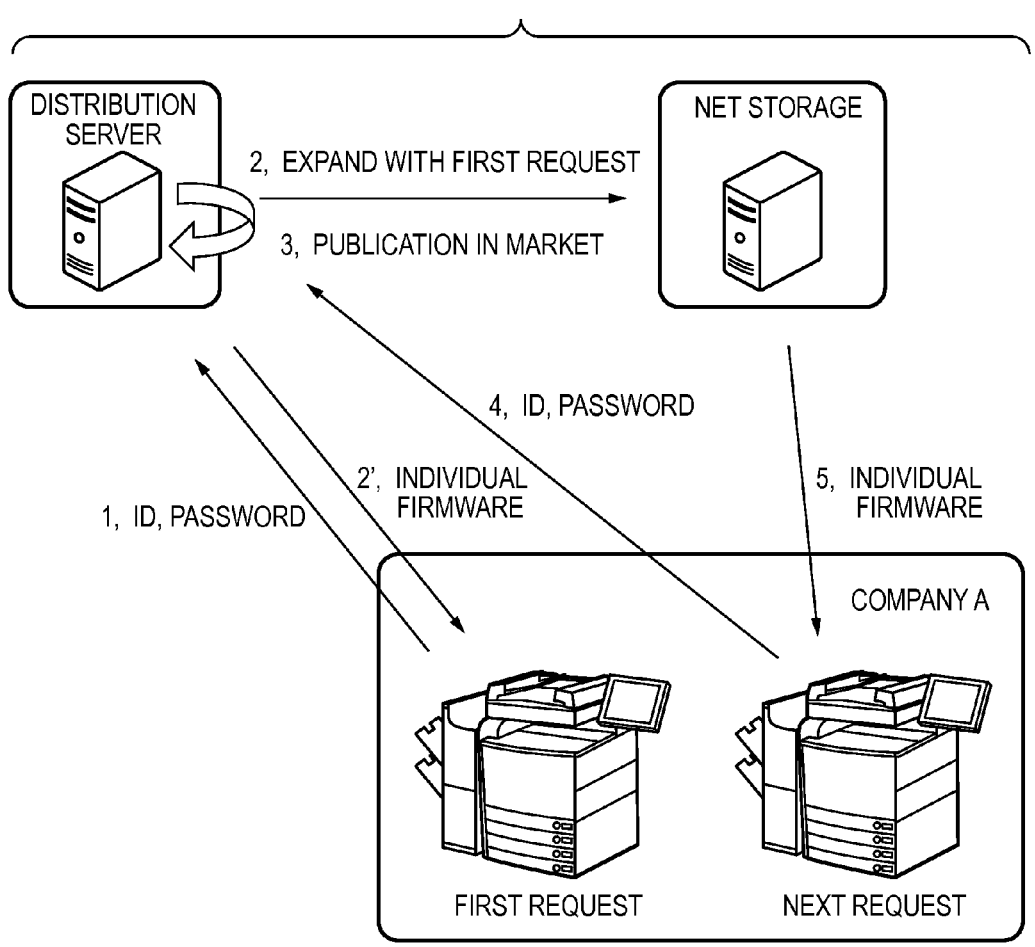
FIG. 22 shows a flow of a distribution system according to the third embodiment.

FIG. 22 shows an overall information flow according to the present embodiment. Specifics of this flow will now be described with reference to FIG. 10. Processing of FIG. 10 is started when, as shown in FIG. 22, the SOAP communication unit 401 of the distribution server 133 receives a download request that has been made by company A using individual firmware in order to use the firmware.

In step S1001, the SOAP message analysis unit 402 determines whether or not a received SOAP message is a download request. If the SOAP message is the download request (YES of step S1001), the present processing flow proceeds to step S1002. If the SOAP message is not the download request (NO of step S1001), the distribution server 133 executes processing corresponding to the request in step S1008. Then, the present processing flow is ended.

In step S1002, the obtained information processing unit 404 confirms whether or not a type of firmware for which the download request has been made is individual firmware. If the type is the individual firmware (YES of step S1002), the present processing flow proceeds to step S1003. If the type is not the individual firmware (NO of step S1002), the present processing flow proceeds to step S1008, and processing corresponding to the type of the firmware is executed. Then, the present processing flow is ended.

In step S1003, the obtained information processing unit 404 executes processing for determining whether or not download processing has already been executed. If downloading has already been performed (YES of step S1003), the present processing flow proceeds to step S1004. If downloading has not been performed (NO of step S1003), the present processing flow is ended. In step S1004, the status information processing unit 408 determines whether or not the status is "publication in market suspended". If the status is "publication in market suspended" (YES of step S1004), the present processing flow proceeds to step S1005. If the status is not "publication in market suspended", the present processing flow is ended.

In step S1005, the external data processing unit 410 executes processing for expanding firmware into the net storage. In step S1006, the content information processing unit 409 rewrites a distribution source (URL) in a reference table from the internal hard disk drive to the net storage. In step S1007, the status information processing unit 408 executes status change processing. This is processing for changing the status of the expanded firmware managed in the distribution server 133, that is to say, changing the status, which was "publication in market suspended" thus far, to "publicized in market". Then, the present processing flow is ended.

Figure 7:
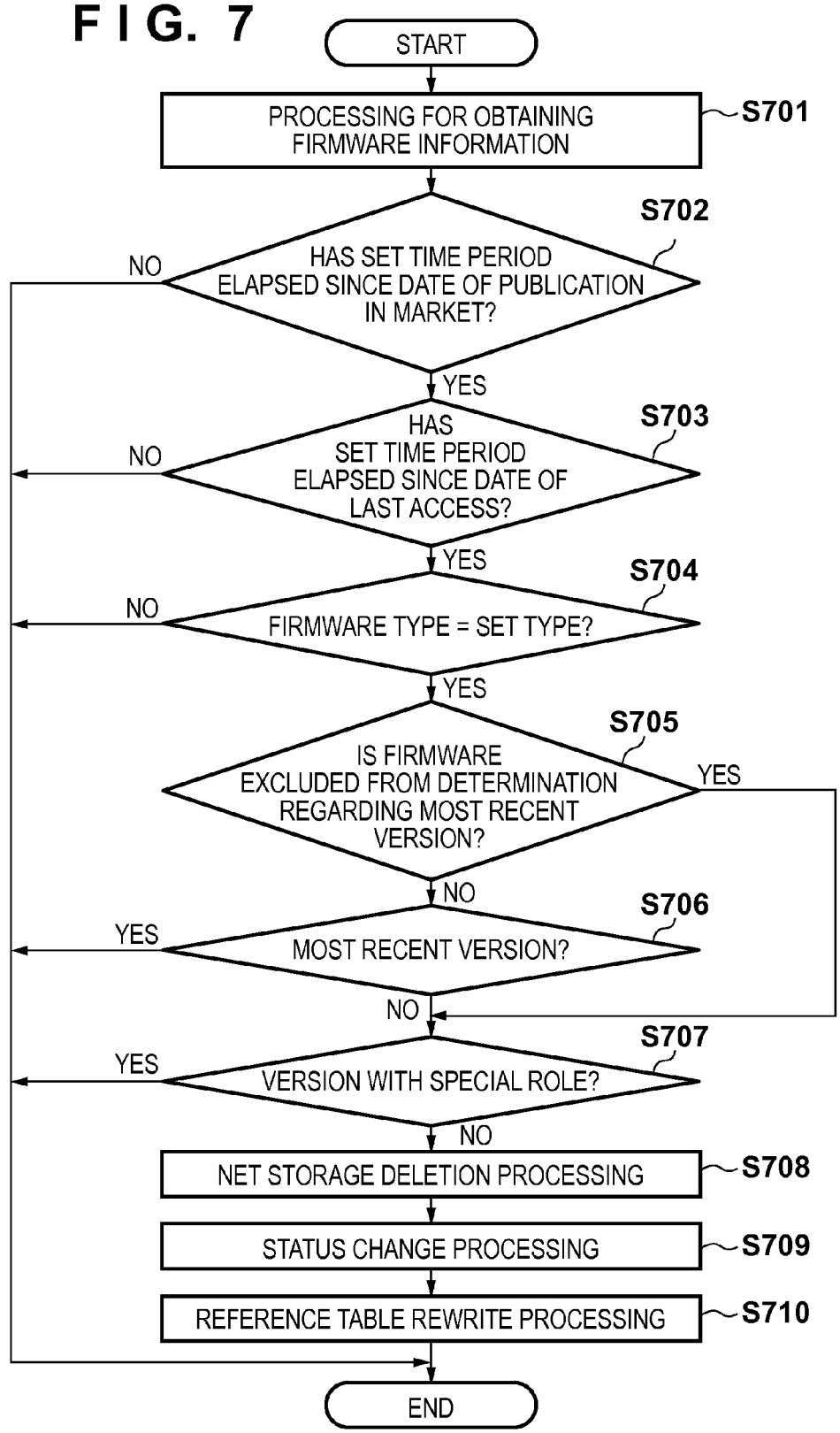
FIG. 7 is a flowchart of a distribution server according to a first embodiment.
Figure 8:
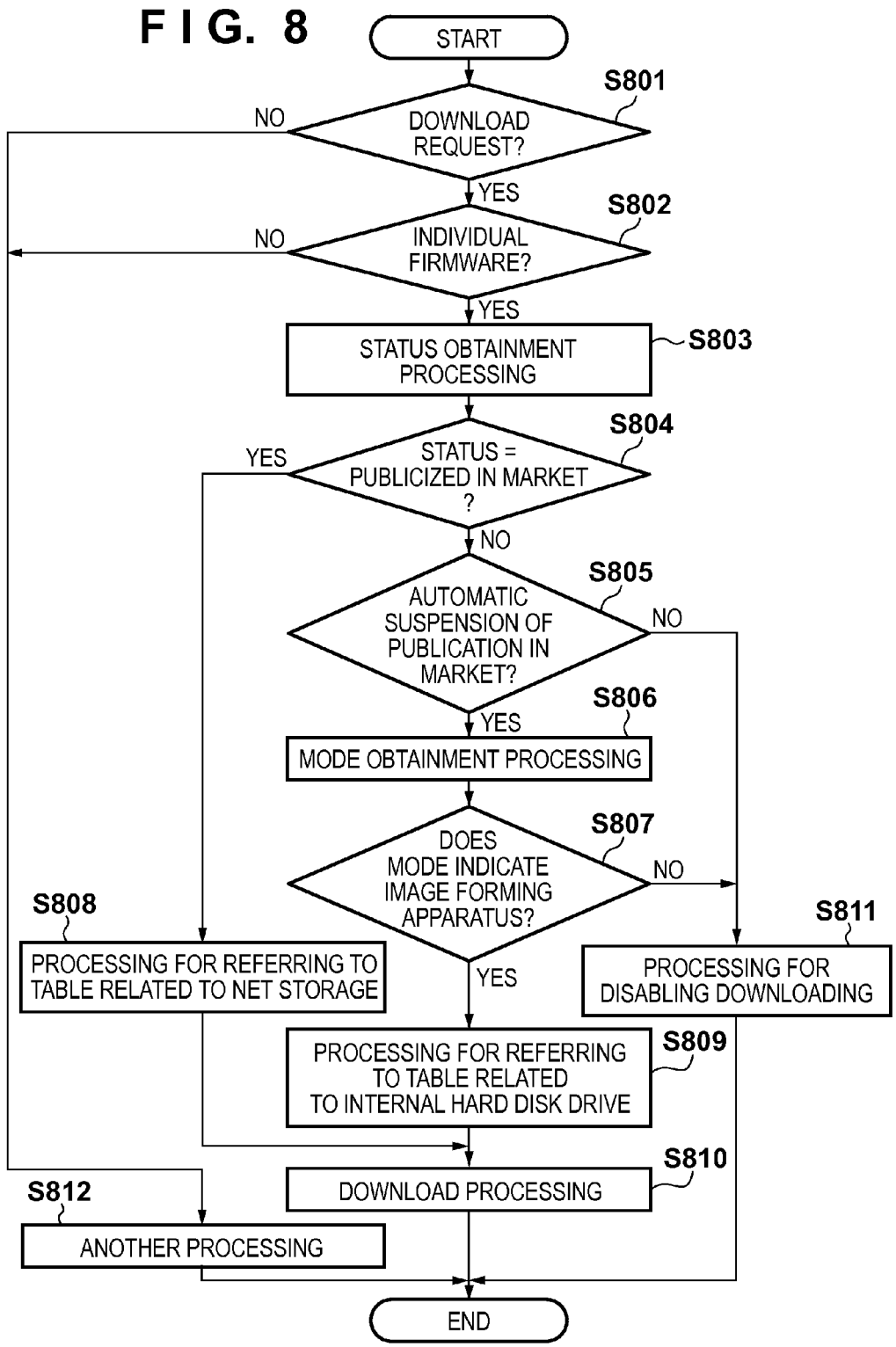
FIG. 8 is a flowchart of the distribution server according to the first embodiment.

It should be noted that, after firmware that has been publicized in the market through the above processing has been downloaded, its publication in the market is suspended and the firmware is deleted from the net storage due to a periodical confirmation or a judgment by an operator who operates the distribution server 133, which are shown in FIG. 7 of the first embodiment.

Through the above-described processing sequence, firmware that has been downloaded once can be downloaded from the net storage at a higher speed when the same request is made from then on.

Fourth Embodiment

According to a fourth embodiment, in a case where a download request has been made for individual firmware, if a distribution history of the individual firmware indicates that the number of times the individual firmware has been distributed is equal to or larger than a prescribed value, the individual firmware is automatically publicized in the market, and faster downloading from a net storage is enabled when the same request is made from then on.

FIG. 16 shows an overall information flow according to the present embodiment. Specifics of this flow will now be described with reference to FIG. 11.

There is a demand that downloading of firmware that has been downloaded once be performed at a higher speed next time. The following describes a flow in which expansion (registration and storage) into the net storage is performed only when the number of times the distribution has been performed is equal to or larger than the prescribed value in consideration of the cost of the net storage. Here, the next request may be made either by an image forming apparatus that has made a previous request, or by another image forming apparatus different therefrom. In the present case, "30" is used as the prescribed value for the number of times the distribution is performed.

Processing of FIG. 11 is started when, as shown in FIG. 16, the SOAP communication unit 401 of the distribution server 133 receives a download request that has been made by company A using individual firmware in order to use the firmware. It should be noted that steps S1101 to S1104 and steps S1106 to S1110 of FIG. 11 are similar to steps S1001 to S1008 of FIG. 10 described in the third embodiment, and therefore a specific description thereof is omitted.

In step S1104, the status information processing unit 408 determines whether or not the status is "publication in market suspended". If the status is "publication in market suspended" (YES of step S1104), the present processing flow proceeds to step S1105. If the status is not "publication in market suspended" (NO of step S1104), the present processing flow is ended.

In step S1105, the database access unit 406 conducts a distribution history search. Specifically, the number of apparatuses to which individual firmware has been distributed is searched for from a database. It will be assumed that, as a result of the search, it is detected that the individual firmware has been distributed to 35 apparatuses.

In step S1106, the obtained information processing unit 404 determines whether or not the number of times the individual firmware has been distributed is equal to or larger than the prescribed value. If the number of times the individual firmware has been distributed is equal to or larger than the prescribed value (YES of step S1106), the present processing flow proceeds to step S1107. If the number of times the individual firmware has been distributed is smaller than the prescribed value (NO of step S1106), the present processing flow is ended. In the present example, as the prescribed value is 30 and the individual firmware has already been distributed to 35 apparatuses, it is determined that the number of times the individual firmware has been distributed is equal to or larger than the prescribed value.

According to the present embodiment, if the number of times the distribution has been performed is equal to or larger than the prescribed value, faster downloading from the net storage is enabled when the same request is made from then on.

It should be noted that the prescribed value used in processing from step S1104 to step S1105 is not limited to the number of times the distribution has been performed, and may be based upon other information, such as a distribution interval.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-111331, filed May 27, 2013, which is hereby incorporated by reference herein in its entirety.

What is claimed is:

1. A distribution control apparatus that controls distribution of firmware to be mounted on an image forming apparatus in a network, comprising:
   a non-transitory memory device;
   a processor;
   a storage control unit configured to cause a first storage unit connected to the network to store different versions of firmware;
   a control unit configured to control, based on information of the different versions of firmware, publication and suspension of publication of the different versions of firmware; and
   a distribution unit configured to cause distribution of a publicized version of firmware from the first storage unit in accordance with a request, wherein
   the control unit causes deletion, from the first storage unit, of a version of firmware whose publication is suspended, and
   the distribution unit causes distribution, from a second storage unit different from the first storage unit, of the version of firmware whose publication is suspended when the request is for the version of firmware whose publication is suspended,
   wherein the storage control unit, the control unit, and the distribution unit are implemented at least in part by the processor executing at least one program recorded on the non-transitory memory device, and wherein the distribution unit causes distribution of the version of firmware whose publication is suspended when the request is from the image forming apparatus, and the distribution unit causes disabling of distribution of the version of firmware whose publication is suspended when the request is from a monitoring center host.

2. The distribution control apparatus according to claim 1, wherein
the information of the different versions of firmware includes at least one of a time period that has elapsed since publication, a time period that has elapsed since a most recent access, a firmware type, and information indicating whether or not the versions are a most recent version.

3. The distribution control apparatus according to claim 2, wherein
the firmware type includes individual firmware that is designed for and provided to a specific user.

4. The distribution control apparatus according to claim 3, wherein
a speed of distribution of the publicized version of firmware from the first storage unit is higher than a speed of distribution of the firmware whose publication is suspended from the second storage unit.

5. The distribution control apparatus according to claim 4, wherein
if the image forming apparatus requests distribution of a version of individual firmware whose publication has been suspended, the distribution unit distributes the individual firmware from the second storage unit.

6. The distribution control apparatus according to claim 4, wherein
if the image forming apparatus requests distribution of a version of individual firmware whose publication has been suspended, the distribution unit causes a module included among a plurality of modules constituting the individual firmware to be distributed from the first storage unit if the module is included in another publicized version of the individual firmware, and distributed from the second storage unit if the module is not included in said another publicized version of the individual firmware.

7. The distribution control apparatus according to claim 3, wherein
if distribution of a version of individual firmware whose publication has been suspended is requested, the storage control unit causes the version of individual firmware to be publicized and stored into the first storage unit.

8. The distribution control apparatus according to claim 3, wherein
if distribution of a version of individual firmware whose publication has been suspended is requested, and the number of times the individual firmware has been distributed be equal to or larger than a prescribed value, the storage control unit causes the version of individual firmware to be publicized and stored into the first storage unit.

9. The distribution control apparatus according to claim 1, further comprising
a designation unit configured to accept designation of firmware for which the control unit controls publication or suspension of publication,
wherein the designation unit is implemented at least in part by the processor executing at least one program recorded on the non-transitory memory device.

10. The distribution control apparatus according to claim 1, wherein
the control unit always publicizes a most recent version of firmware.

11. The distribution control apparatus according to claim 1, wherein
the control unit always publicizes a version of firmware that is required for a stepwise update to a different version.

12. A distribution control method that controls distribution of firmware to be mounted on an image forming apparatus in a network, comprising:
causing a first storage unit connected to the network to store different versions of firmware;
controlling, based on information of the different versions of firmware, publication and suspension of publication of the different versions of firmware;
causing distribution of a publicized version of firmware from the first storage unit in accordance with a request;
deleting, from the first storage unit, a version of firmware whose publication is suspended;
causing distribution, from a second storage unit different from the first storage unit, of the version of firmware whose publication is suspended when the request is for the version of firmware whose publication is suspended and the request is from the image forming apparatus; and
disabling distribution of the version of firmware whose publication is suspended when the request is for the version of firmware whose publication is suspended and the request is from a monitoring center host.

13. A non-transitory computer-readable medium storing a program for causing a computer to execute a distribution control method that controls distribution of firmware to be mounted on an image forming apparatus in a network, the method comprising:
causing a first storage unit connected to the network to store different versions of firmware;
controlling, based on information of the different versions of firmware, publication and suspension of publication of the different versions of firmware;
causing distribution of a publicized version of firmware from the first storage unit in accordance with a request;
deleting, from the first storage unit, a version of firmware whose publication is suspended;
causing distribution, from a second storage unit different from the first storage unit, of the version of firmware whose publication is suspended when the request is for the version of firmware whose publication is suspended and the request is from the image forming apparatus; and
disabling distribution of the version of firmware whose publication is suspended when the request is for the version of firmware whose publication is suspended and the request is from a monitoring center host.

14. A system including an image forming apparatus and a distribution control apparatus that controls distribution of firmware to be mounted on the image forming apparatus in a network,
wherein the image forming apparatus comprises:
a non-transitory memory device;
a processor; and
a request unit configured to send a request,
wherein the distribution control apparatus comprises:
a non-transitory memory device;
a processor;
a storage control unit configured to cause a first storage unit connected to the network to store different versions of firmware;

a control unit configured to control, based on information of the different versions of firmware, publication and suspension of publication of the different versions of firmware; and a distribution unit configured to cause distribution of a publicized version of firmware from the first storage unit in accordance with a request, wherein the control unit causes deletion, from the first storage unit, of a version of firmware whose publication is suspended, and the distribution unit causes distribution, from a second storage unit different from the first storage unit, of the version of firmware whose publication is suspended when the request is for the version of firmware whose publication is suspended, wherein the request unit of the image forming apparatus is implemented at least in part by the processor of the image forming apparatus executing at least one program recorded on the non-transitory memory device of the image forming apparatus, wherein the storage control unit, the control unit, and the distribution unit of the distribution control apparatus are implemented at least in part by the processor of the distribution control apparatus executing at least one program recorded on the non-transitory memory device of the distribution control apparatus, and wherein the distribution unit causes distribution of the version of firmware whose publication is suspended when the request is from the image forming apparatus, and the distribution unit causes disabling of distribution of the version of firmware whose publication is suspended when the request is from a monitoring center host.

\* \* \* \* \*